United States Patent
Thompson

(10) Patent No.: US 9,477,299 B2
(45) Date of Patent: Oct. 25, 2016

(54) SYSTEMS AND METHODS FOR FACILITATING DEVICE CONTROL, DEVICE PROTECTION, AND POWER SAVINGS

(71) Applicant: ECHOSTAR UK HOLDINGS LIMITED, Keighley, West Yorkshire (GB)

(72) Inventor: Geoffrey Thompson, Keighley (GB)

(73) Assignee: EchoStar UK Holdings Limited, Steeton (GB)

( * ) Notice: Subject to any disclaimer, the term of this patent is extended or adjusted under 35 U.S.C. 154(b) by 177 days.

(21) Appl. No.: 14/302,058

(22) Filed: Jun. 11, 2014

(65) Prior Publication Data
US 2015/0362985 A1    Dec. 17, 2015

(51) Int. Cl.
| | |
|---|---|
| *G06F 1/26* | (2006.01) |
| *G06F 1/32* | (2006.01) |
| *H01R 13/66* | (2006.01) |
| *H01R 13/68* | (2011.01) |
| *H01R 24/30* | (2011.01) |

(52) U.S. Cl.
CPC ........... *G06F 1/3293* (2013.01); *G06F 1/3215* (2013.01); *H01R 13/6675* (2013.01); *G06F 1/266* (2013.01); *H01R 13/6666* (2013.01); *H01R 13/68* (2013.01); *H01R 24/30* (2013.01)

(58) Field of Classification Search
CPC .............................. H01H 47/00; H01R 25/00
USPC ........................................................ 713/320
See application file for complete search history.

(56) References Cited

U.S. PATENT DOCUMENTS

| | | | |
|---|---|---|---|
| 7,666,033 B1 | 2/2010 | Fung | |
| 7,964,989 B1 | 6/2011 | Puschnigg et al. | |
| 8,461,725 B1* | 6/2013 | Stubbs ............... | H01H 9/54 307/140 |
| 9,231,351 B2* | 1/2016 | Chung ............... | H01R 13/665 |
| 2007/0105415 A1* | 5/2007 | Jin ............... | H01R 13/6675 439/122 |
| 2010/0008006 A1* | 1/2010 | Satoru ............... | H02H 3/105 361/93.1 |
| 2010/0109619 A1* | 5/2010 | Tsou ............... | H02J 3/14 323/234 |

(Continued)

FOREIGN PATENT DOCUMENTS

WO    2005/022692 A2    3/2005

OTHER PUBLICATIONS

European Search Report for EP 15170972 mailed Nov. 9, 2015, 8 pages.

*Primary Examiner* — Vincent Tran
(74) *Attorney, Agent, or Firm* — Kilpatrick Townsend & Stockton LLP

(57) ABSTRACT

Systems, methods, and apparatus to facilitate wireless device monitoring and control are provided. A first device controller may be adapted to be disposed within a power connector, in series with conductors of the power connector. The power connector may be adapted to provide power from a power source to a device. The first device controller may include two terminals to electrically couple the first device controller with the conductors of the power connector. The first device controller may further include a power component to power the first device controller. The first device controller may be configured to monitor one or more conditions of the device, control one or more functions of the device, and wirelessly communicate with a system controller that is remote from the power connector and the device. The power connector may correspond to a power plug and/or a terminal block.

20 Claims, 10 Drawing Sheets

(56) References Cited

U.S. PATENT DOCUMENTS

| | | | |
|---|---|---|---|
| 2010/0145542 A1* | 6/2010 | Chapel | H02J 13/0082 700/295 |
| 2010/0148591 A1* | 6/2010 | Lim | H01R 13/655 307/125 |
| 2010/0305773 A1* | 12/2010 | Cohen | H02J 3/14 700/296 |
| 2011/0121662 A1* | 5/2011 | Huang | H02H 3/00 307/125 |
| 2011/0187557 A1* | 8/2011 | Dietzler | G05F 1/10 340/870.16 |
| 2012/0028488 A1 | 2/2012 | Puschnigg et al. | |
| 2013/0164971 A1* | 6/2013 | Chung | H01R 13/665 439/489 |
| 2013/0234534 A1 | 9/2013 | Lin | |
| 2013/0314069 A1 | 11/2013 | Suzuki | |
| 2014/0172184 A1* | 6/2014 | Schmidt | G06Q 50/06 700/295 |
| 2014/0312849 A1* | 10/2014 | Lee | H02J 7/0068 320/134 |

\* cited by examiner

SYSTEMS AND METHODS FOR FACILITATING DEVICE CONTROL, DEVICE PROTECTION, AND POWER SAVINGS

BACKGROUND

The present disclosure relates in general to device control, and, more specifically, but not by way of limitation, to systems, methods, and apparatus for facilitating device control, device protection, and power savings.

Currently, in order to upgrade a home for control and monitoring of devices, it is necessary to fit individual smart adapters which go between the power socket and the plug. These are often expensive and bulky. There is a need for solutions to address such a problem and related problems in space-constrained implementations in manners suitable for low-cost, high-volume manufacturing processes.

BRIEF SUMMARY

Certain embodiments of the present disclosure relate in general to device control, and, more specifically, but not by way of limitation, to systems, methods, and apparatus for facilitating device control, device protection, and power savings.

In one aspect, a system to facilitate wireless device monitoring and control is disclosed. The system may include any one or combination of the following. A first device controller may be adapted to be disposed within a power plug, in series with conductors of the power plug. The power plug may be adapted to provide power from a power source to a device. The first device controller may include two terminals to electrically couple the first device controller with the conductors of the power plug. The first device controller may include a power component to power the first device controller. The first device controller may be configured to monitor one or more conditions of the device, control one or more functions of the device, and wirelessly communicate with a system controller that is remote from the power plug and the device.

In another aspect, a method to facilitate wireless device monitoring and control is disclosed. The method may include performing any one or combination of the following. A first device controller may be adapted to be disposed within a power plug, in series with conductors of the power plug. The power plug may be adapted to provide power from a power source to a device. The first device controller may include two terminals to electrically couple the first device controller with the conductors of the power plug. The first device controller may include a power component to power the first device controller. The first device controller may be configured to monitor one or more conditions of the device, control one or more functions of the device, and wirelessly communicate with a system controller that is remote from the power plug and the device.

In yet another aspect, one or more non-transitory, machine-readable media are disclosed. The one or more non-transitory, machine-readable media may have machine-readable instructions thereon which, when executed by one or more processing devices, facilitates wireless device monitoring and control, causing the one or more processing devices to perform any one or combination of the following. One or more conditions of a first device may be monitored via a first device controller adapted to be disposed within a power plug in series with conductors of the power plug, the power plug adapted to provide power from a power source to the first device. One or more functions of the first device may be controlled via the first device controller. A system controller that is remote from the power plug and the device may be wirelessly communicated with, via the first device controller.

In various embodiments, the first device controller may be further configured to provide overcurrent protection for the device to protect the device from overload. In various embodiments, the one or more processing devices may be caused to provide overcurrent protection for the device to protect the device from overload.

In various embodiments, the system controller may be configured to wirelessly communicate with a set of one or more device controllers. The set of one or more device controllers may include the first device controller. The system controller may be configured to monitor the set of one or more device controllers. In various embodiments, the one or more processing devices may be caused to wirelessly communicate first information to the system controller to facilitate monitoring of the first device by the system controller.

In various embodiments, the system controller is further configured to control the set of one or more device controllers. In various embodiments, the system controller may be further configured to process an indication of a trigger event, select a first configuration from a set of system configurations based at least in part on the indication of the trigger event, and transmit a command to at least one device controller of the set of one or more device controllers to cause at least one device controller to control the device in conformity with a first operational mode, of at least one device controller including the first device controller. The first device controller may be further configured to, in response to the command, control the device in conformity with the first operational mode at a first time. In some embodiments, the first configuration may correspond to a power savings configuration.

In various embodiments, the one or more processing devices may be caused to process a set of one or more commands received from the system controller to control the first device controller, and cause the first device controller to act in conformity with the set of one or more commands. In various embodiments, the one or more processing devices may be caused to transmit an indication of a trigger event to the system controller, process a command from the system controller, and, responsive to the command, control the first device in conformity with a first operational mode at a first time.

In various embodiments, the first device controller may be further configured to control the device in conformity with a second operational mode at a second time after the first time. In various embodiments, the one or more processing devices may be caused to control the first device in conformity with a second operational mode at a second time after the first time.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
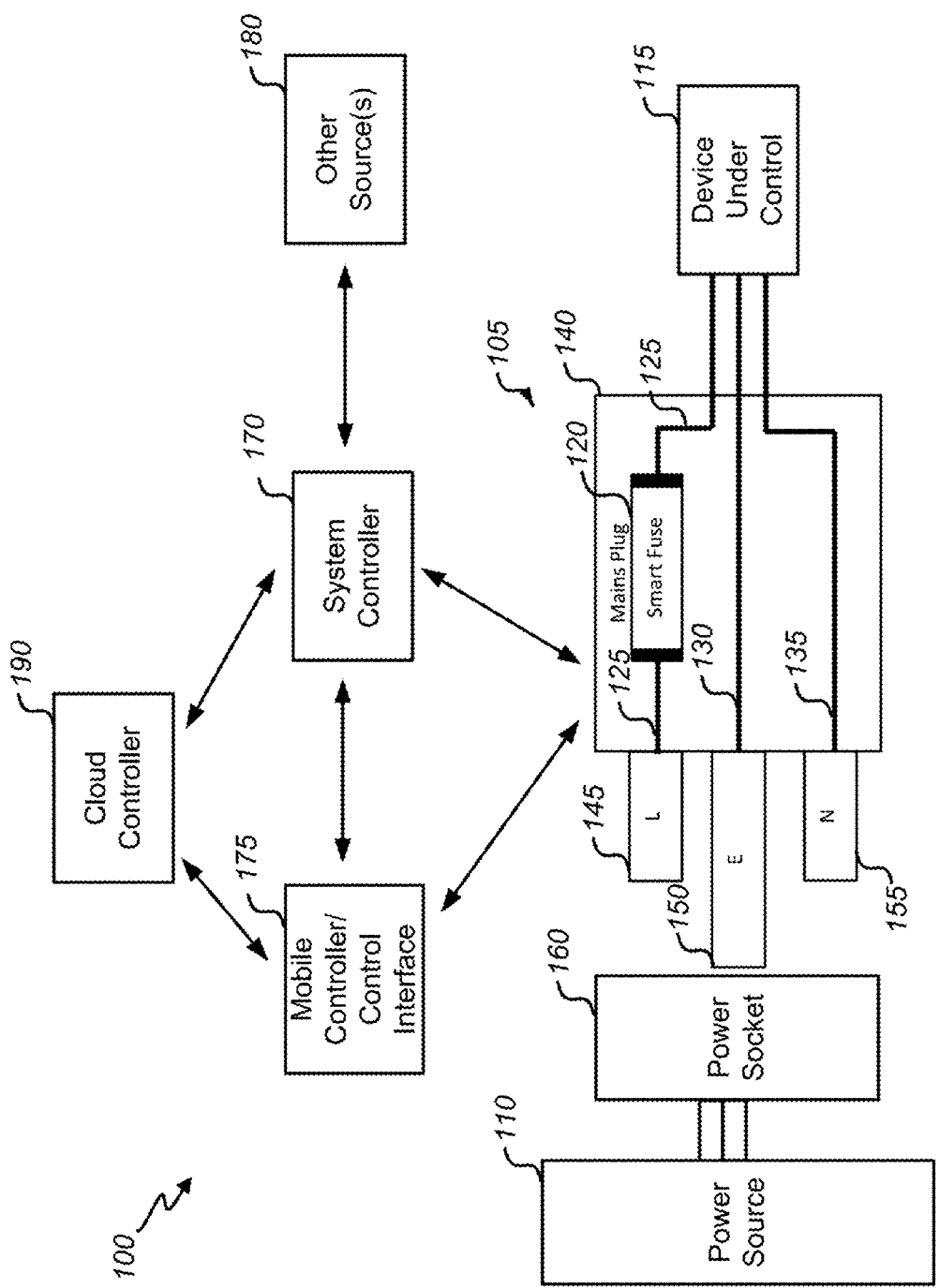
FIG. 1 illustrates a diagram of an overview of a system to facilitate device control, device protection, and power savings, in accordance with certain embodiments of present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Certain embodiments according to the present disclosure may provide for a "smart fuse" that is neither expensive nor bulky, and that provides a solution for space-constrained implementations in manners suitable for low-cost, high-volume manufacturing processes. A smart fuse device may be individually controlled from any paired system controller. By integrating smart fuse devices with a smart control application on a system controller, there are a number of benefits that can be achieved. Certain embodiments may facilitate upgrading a home for control and monitoring of devices. Certain embodiments may provide easy means to automate many of the devices within the home. For instance, a lamp could be programmed to come on at certain times of the day or to go off automatically at certain times. In the case of devices such as a lamp, the smart fuse may enable a dimming function. A further advantage of certain embodiments could be the direct integration within a plug for a device. This could facilitate adoption within many markets.

Further benefits may include the ability to permanently monitor connected devices which enables to provide detailed logs regards the power usage for the device. This could then be used to target energy savings around the home by identifying usage patterns and periods when individual devices could be disabled. It will be possible to analyze power usage for individual devices according to time of day. Automatic warnings can then be generated for instance when lights are switched on for long periods during the day. Suggestions can be made as to the optimum time to operate devices, when there are maybe variable power tariffs.

Various embodiments will now be discussed in greater detail with reference to the accompanying figures, beginning with FIG. 1.

FIG. 1 illustrates a diagram of an overview of an embodiment of a system 100 to facilitate device control, device protection, and power savings, in accordance with certain embodiments of present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific.

The system 100 may include one or more power plugs 105 adapted for connection to one or more power sources 110. In various embodiments, the power plug 105 may be a mains plug or any other suitable power plug that allows electrically operated equipment to be connected to a power source 110. The example depicted corresponds to a mains plug 105 adapted for electrical connection to an AC power source 110. Alternative embodiments could be directed to any one or combination of another type of power plug of any suitable shape, size, and connector type, a DC power configuration, and/or any suitable voltage rating. Types of plugs 105 may be implemented according to particular national standards in certain embodiments. As depicted, the power plug 105 may be electrically connected to a device under control 115. The device under control 115 may correspond to a portable appliance or any other electrically operated device that is powered via the power plug 105 in various embodiments.

The power plug 105 includes a device controller 120 adapted to be disposed within the power plug 105. The power plug 105 may correspond to a mains plug that conforms to power plug standards for certain countries, such as the United Kingdom. The power plug 105 may include line 125, ground 130, and neutral 135 conductors. The conductors may extend from the plug casing 140 to the device under control 115. And the conductors may be electrically connected to corresponding terminals 145, 150, 155. The terminals 145, 150, 155 may be adapted for insertion into a typical socket 160 for electrical connection to the power source 110.

In some embodiments, the device controller 120 may be adapted to be disposed in series with a conductor of the power plug 105. In the example depicted, the device controller 120 is disposed in series with the line conductor 125 and the line terminal 145. In the United Kingdom, for example, household devices are each typically fitted with a mains plug which contains a small, replaceable safety fuse, in series with the live terminal. Other countries may also have similar safety devices which could also be used as a common point on control. Other embodiments are possible. As in the example depicted, the device controller 120 may be adapted to be disposed in place of the typical safety fuse. The device controller 120 may have the same dimensions as the standard safety fuse and may be configured to perform the overload protection function of the standard safety fuse. Accordingly, in some embodiments, the device controller 120 may be miniaturized and integrated within the power plug 105 to provide a smart controller to replace this fuse cartridge. Hence, the device controller 120 may be referred herein as a "smart fuse" or "smart fuse device."

The power plug 105 may be configured to monitor power to the device under control 115. The power plug 105 may be further configured to control the power flow to the device under control 115 by conducting or not conducting current so as to turn the device under control 115 on and off. The device controller 120 may act as an electronic, resettable fuse by automatically turning the device off in case of overload. However, various embodiments may be extended and other embodiments could be made for use in locations which do not require the primary protection of a fuse, but which could benefit from the switching and control capability.

In some embodiments, the power plug 105 may also be able to regulate the current and voltage so as to provide a gradient of control beyond binary control of simply powering or not powering the device under control 115. In some embodiments, the power plug 105 may be configured to provide additional features of communication, monitoring, and/or control that would provide an advantageous means to automate multiple devices within a home, office, and/or any appropriate environment. The device controller 120 may be a self-powered controller which can be controlled from other devices on a network. The device controller 120 may be individually identifiable. The device controller 120 may include a controller, a means of obtaining power from a single power line when the device is powered, a means of maintaining power, e.g. battery when the device is off, monitoring of the current, the ability to turn itself on and off and a means of communication most likely using an RF signaling technology.

The system 100 may include a system controller 170. The system controller 170 may be configured to manage the one or more smart devices 120. The system controller 170 may provide a link if necessary between the communication protocol used by the device controller 120 and the communication protocol used by any mobile controller 175. In some embodiments, this may be a bridge between Zigbee and Wi-Fi, for example. In some embodiments, the system controller 170 may be integrated within a set-top box, a television, or another household device.

The system controller 170 may provide a user interface to allow for output of information to a user and for input from user with one or more user-selectable options. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like.

The system controller 170 may contain schedules and timers for when devices under control 115 should be turned on, turned off, dimmed, configured to operate in a power savings mode, etc. It may contain prohibited times when devices cannot be used, e.g., blackout times for a children's TV or computer, which may be set by a user. It provides a means for creating more detailed interaction between devices.

In some embodiments, system controller 170 may include the option for inputs from one or more other sources 180. For example, an external light sensor may be used as a trigger to turn on certain lights around the house. As another example, a temperature sensor may be used as trigger to activate/deactivate certain appliances. A power configuration could designate a temperature threshold such that the operation mode(s) for one or more appliance would be initiated when an inside temperature and/or an outside temperature in the location meets or exceeds the temperature threshold. For examples, heaters could be controlled, air conditioning units could be controlled, other appliances could be controlled to minimize operations during a hot time of day, etc. The one or more other sources 180 could include any suitable sensor or other data source, which could be network-accessible, such as a service provider or private/public data source.

The system 100 may include one or more mobile controllers/control interface 175. A mobile controller/control interface 175 may include computing device configured with a control application. The computing device may include a tablet, smartphone, PC, laptop, set-top box, television, and/or any other computing system or device. In some embodiments, control may be allowed from multiple devices around the home interfacing to the system controller 170. The system may also allow control from outside of the home, in this case control is likely to be routed by way of servers in the "cloud" by way of a cloud controller 190.

Figure 2A:
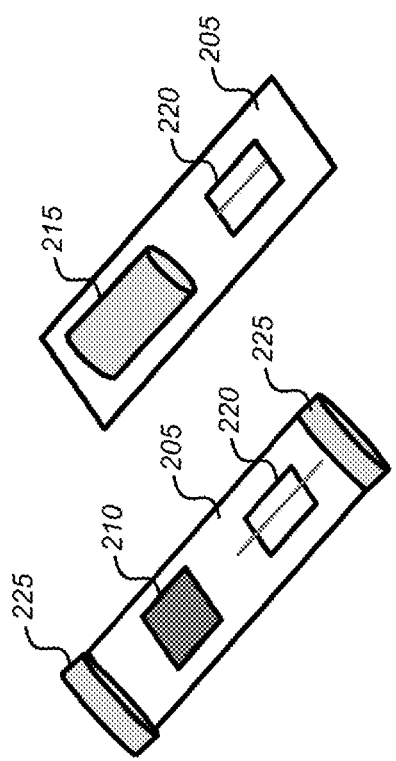
FIGS. 2A, 2B, and 2C illustrate diagrams of a device controller, in accordance with certain embodiments of present disclosure.
Figure 2B:
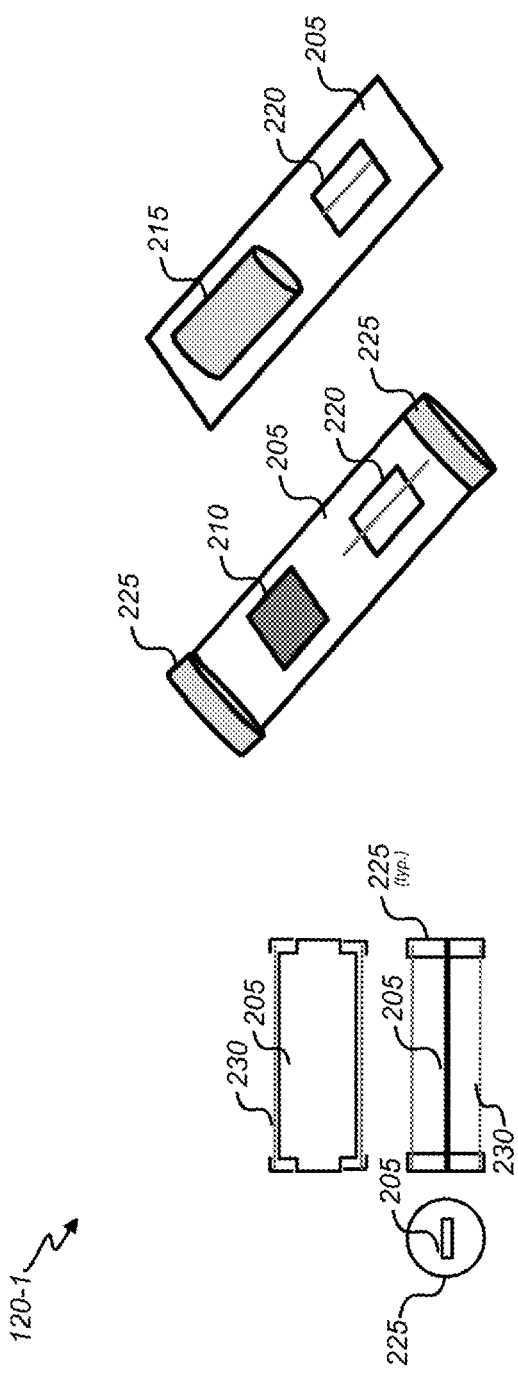
Figure 2C:
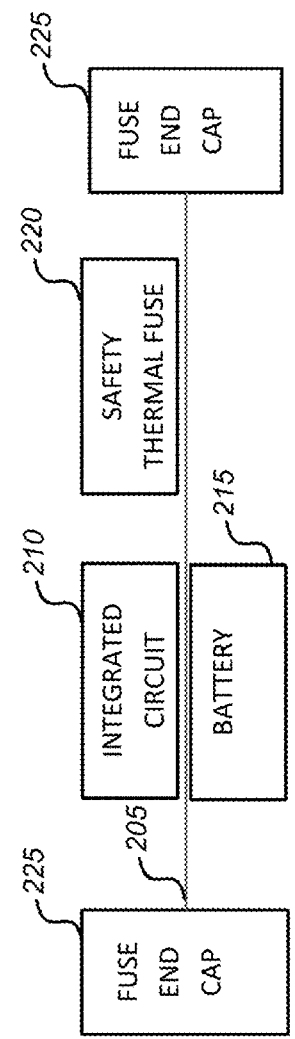

FIGS. 2A, 2B, and 2C illustrate diagrams of a device controller 120-1, in accordance with certain embodiments of present disclosure. FIG. 2A illustrates top, side, and end views of certain portions of the device controller 120-1. FIG. 2B illustrates two quasi-isometric views of certain portions of the device controller 120-1. FIG. 2C illustrates a block diagram of certain portions of the device controller 120-1.

The device controller 120-1 may, in certain respects, have aspects of a fuse cartridge, in some embodiments. For example, the device controller 120-1 may be formed in size, shape, and/or function as a fuse cartridge. As a more specific example, some embodiments may be adapted to meet requirements of the BS1362 standard for the UK market. Other embodiments may be adapted to meet requirements of other similar standards, which may be directed to other national standards and/or other markets.

The device controller 120-1 may include one or more substrates 205, which could be a PCB or any other substrate suitable for carrying certain components of the device controller 120-1. The substrate 205 and interior components may be at least partially surrounded by a housing 230 of any suitable material. The device controller 120-1 may include one or more integrated circuit 210. The integrated circuit 210 could provide certain functionalities, such as a switching functionality and a sensing functionality. The device controller 120-1 may include an energy storage component 215, such as one or more batteries.

The device controller 120-1 may include a fuse element 220. In some embodiments, the fuse element 220 may be composed directly on the substrate 205, for example, with a suitably dimensioned and thickened PCB trace or with a wire element. In the latter case, the PCB may use a cut-out to thermally isolate the fuse from the board. The substrate 205 may be connected to end caps 225. This may involve a small extension to each end of the PCB being plated and which can be fitted into a slot in an end cap 225. The assembly components may be connected with a high temperature solder and/or the like. The connection to the end caps 225 may also provide a means to extract heat from the fuse circuitry to be dissipated via pins of the power plug 105 (e.g., via terminal 145).

Figure 3:
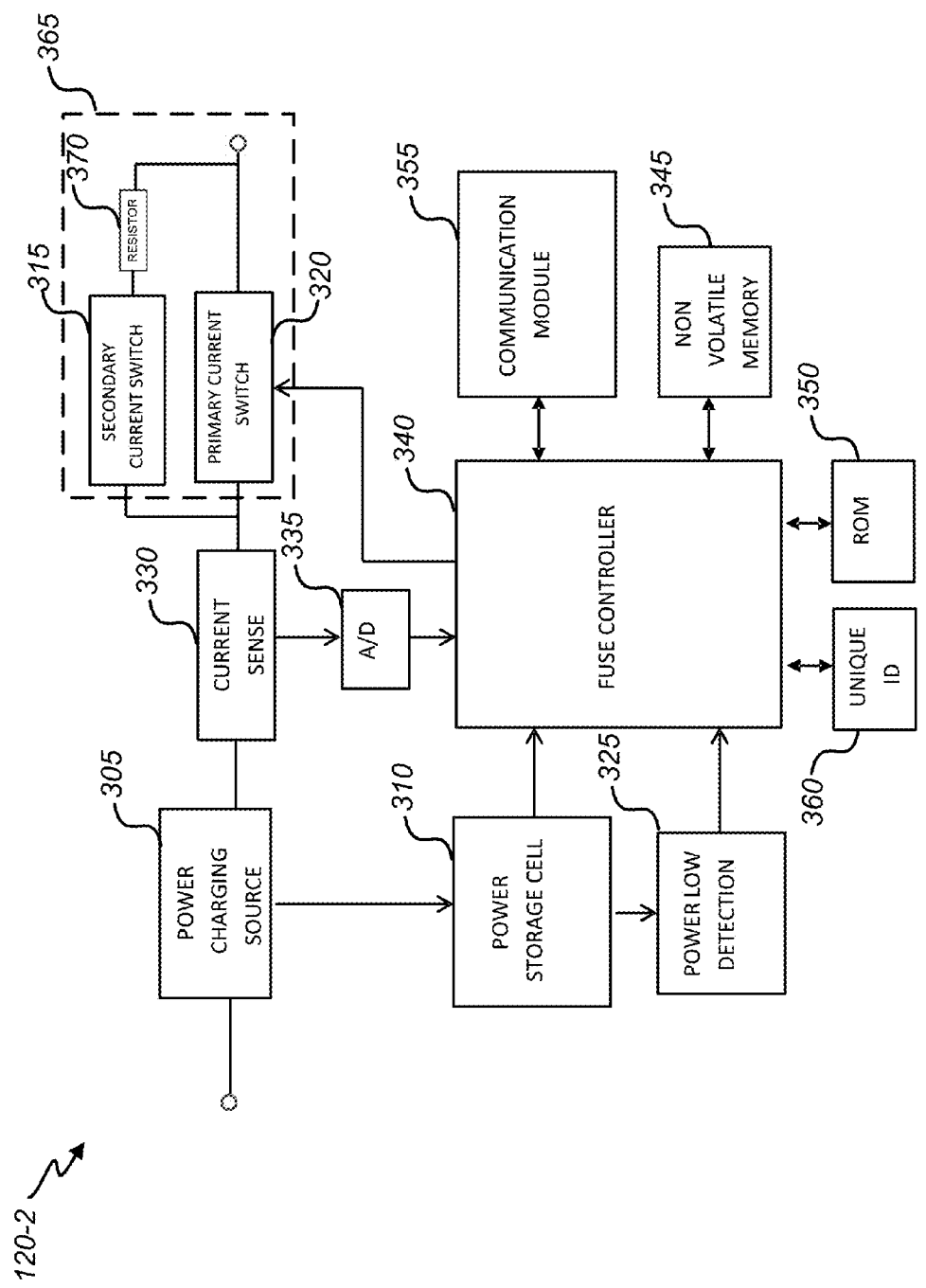
FIG. 3 illustrates a block diagram of a device controller, in accordance with certain embodiments of present disclosure.

FIG. 3 illustrates a block diagram of a device controller 120-2, in accordance with certain embodiments of present disclosure. The device controller 120-2 may include a switching component 365. The switching component 365 may be electrically coupled to one terminal for electrical coupling to the device under control 115. In some embodiments, the switching component 365 may include a primary current switch 320 and a secondary current switch 315. The switching component 365 may facilitate control of current flow to the device under control 115.

Since it is necessary for the device controller 120-2 to be controlled even when the device under control 115 is switched off, it is necessary to maintain power in the device controller 120-2. To that end, the device controller 120-2 may include a power storage 310, which may correspond to the storage component 215. The device controller 120-2 may include a power charging source 305 to enable charging of the power storage 310. When the device under control 115 is turned on and current is flowing to the device 115, it is possible for the device controller 120-2 to utilise the current flow and to recharge its internal power storage 310.

The power storage 310 may include one or more battery cells, one or more capacitors, and/or a similar charge storage device. The capacity of the power storage 310 may typically be such that, under normal operating conditions, the power storage 310 can be adequately refreshed whenever the device under control 115 is operational. The power storage 310 may have sufficient capacity to power the device controller 120-2 and allow for communications for long periods even when the device under control 115 is switched off. Because of the differing device under control 115 usage models in various implementations, different embodiments may be specified with different power storage 310 capacities to cope with different recharging regimes. Various embodiments of device controllers 120-2 may be optimized for constant switching on/off (e.g., daily usage, hourly usage, etc.) and/or for relatively long off periods (e.g., off periods which may last for a year or more).

The power charging source 305 may be configured to tap into the flow of current to the device under control 115. In some embodiments, the power charging source 305 may cause a small amount of current to flow through a power generation circuit of the power charging source 305. In addition or in alternative, the power charging source 305 may take the whole current through a transformer circuit of the power charging source 305.

Due to the variability of the load current to the device under control 115, the power charging source 305 may contain one or more sensing elements and one or more switchable elements so that, for instance, with a small load, more current is passed through the power storage circuit to charge the power storage cell 310. Thus, as the device load increases, a smaller proportion may be tapped. In the case when the device is switched off, the device controller 120-2 may turn on the device under control 115 momentarily for short periods such that the device under control 115 is not activated.

In some embodiments, this method may be enhanced by switching the secondary current switch 315 to allow only a small current to flow. By allowing a small current to flow, this may be sufficient in itself to charge the power storage 310, in some embodiments. In this case, the power charging source 305 may be automatically reconfigured to operate from a lower current. In addition or in alternative, in various embodiments, the low current may allow the device controller 120-2 to monitor the timing of the AC mains cycle and to switch the primary current switch 320 on in synchronization.

The device controller 120-2 may include a power detector 325 configured to monitor the voltage being stored in the device controller 120-2. The power detector 325 may detect when the voltage starts to drop so that it is possible to perform a background recharging of the power storage 310. The power detector 325 may be communicably coupled with the fuse controller 340. The device controller 120-2 may also send a message to the system controller 170 when the power storage 310 is getting low and/or critically low so that the user may be informed.

The device controller 120-2 may include a current sensor 330. This component may be configured to monitor the current flow. The current sensor 330 may use a low-impedance resistive element which generates a voltage across it proportional to the current flowing. This voltage may be converted using an A/D converter 335 or a similar converter into a digital representation. As well as providing information relating to the instantaneous current flow, this may also allow synchronization of functionality with cycles of AC mains. The A/D converter 335 may require a high resolution to cope with the wide variation in load currents and also to be fast, as it must respond to the alternating mains cycle and rapidly to fault conditions. The output of the A/D converter 335 may be fed as a digital word to the fuse controller 340.

The primary current switch 320 can enable or disable power flow to the device under control 115. The primary current switch 320 may include a suitable relay, semiconductor switch (e.g., a thyristor or TRIAC), and/or the like. In some embodiments, the primary current switch 320 may be configured to limit the flow of current and provide a dimming function by only switching the device under control 115 on for a part of each mains cycle. By varying the point during the mains cycle when the device is switched on, the total power can be reduced.

The secondary current switch 315 can enable or disable a lower power flow to the device under control 115. The secondary current switch 315 may include a suitable relay, semiconductor switch (e.g., a thyristor or TRIAC), and/or the like. A resistive element in series with the switch 370 may limit the current to lower amounts. The current would be limited to a value that is just sufficient to charge the storage cell. The resistive element may be programmable in value with further switches to allow for the current to be varied depending upon the load. By allowing only a small current to flow initially, it may be possible to synchronize the switching of primary current switch 320 with the zero crossing point of the AC mains cycle. This may provide benefits in terms of reducing interference. This low current mode may also be used to enable a background charging when the device under control 115 is meant to be off.

The fuse controller 340 may be the main intelligence responsible for monitoring and controlling all actions within the device controller 120-2. The fuse controller 340 may be powered by the power storage 310. The fuse controller 340 may include a microprocessor with programming instructions stored in any suitable form of non-volatile memory 345. The fuse controller 340 could include dedicated logic circuits programmed to detect and respond to defined input conditions. The fuse controller 340 may be responsible to read the digital input values to determine the instantaneous current flow. By comparing the rate of increase/decrease of the current throughout the AC mains cycle, the fuse controller 340 may estimate what the precise position within that mains cycle is and, therefore, what the peak/RMS value will be for that cycle. The fuse controller 340 may compare this value against a threshold for operation of the device controller 120-2 and/or the device under control 115, and if the threshold is exceeded the device controller 120-2 will switch off the device under control 115. The fuse controller 340 may then send a warning message to the system controller 170. The fuse controller 340 may gather data and send updates of power usage to the system controller 170. The fuse controller 340 can manage local timers and schedules for the device controller 120-2 so that it can continue to operate even when it loses communication with the system controller 170.

The non-volatile memory 345 may retain recordings of the power usage. In some embodiments, the data may be stored only for a sufficient time to allow for uploading of the data to the system controller 170 via a communication module 355. In order to reduce the amount of data that must be sent, the values could be averaged over a period of time, in some embodiments. If the device under control 115 is a static load, the frequency of reporting may be further reduced, in some embodiments. For example, reporting could be directed to instances when a change occurs. In the case of a microcontroller-based system, the non-volatile memory 345 may also store operating instructions, and/or they may be programmed in a read-only memory 350.

The communication module 355 may include any one or combination of Zigbee, Bluetooth, Z-Wave, Wi-Fi, and/or the like RF communication modules which allow the device controller 120-2 to communicate wirelessly with a central control point. In addition or in alternative, a mains communication module could be used.

Figure 4:
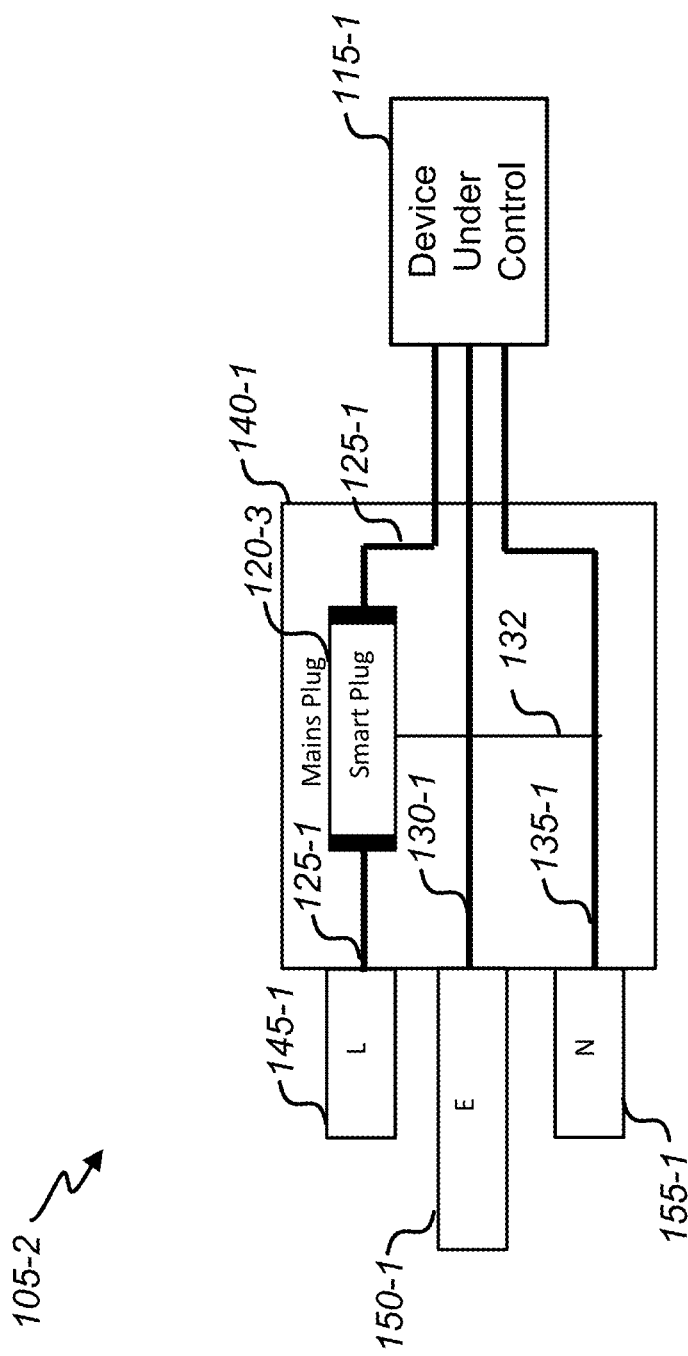
FIG. 4 illustrates a diagram of a power plug, in accordance with certain embodiments of present disclosure.
Figure 5:
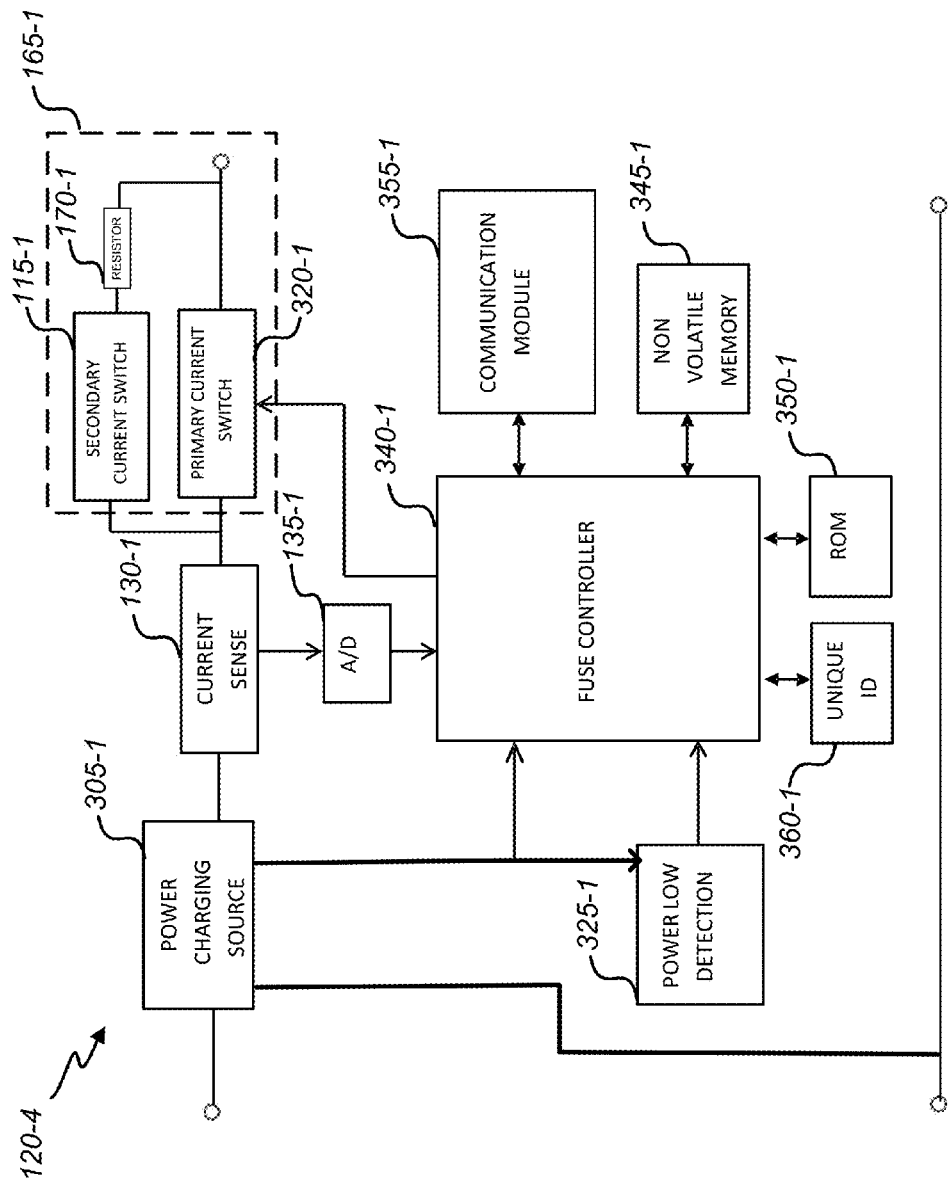
FIG. 5 illustrates a block diagram of a device controller, in accordance with certain embodiments of present disclosure.

FIG. 4 illustrates a diagram of a power plug 105-1, in accordance with certain embodiments of present disclosure. The power plug 105-1 is another embodiment where the device controller 120-3 may be fully integrated within power plug 105-1. In some embodiments, the device controller 120-3 may not removable. The device controller 120-3 may be configured to powered directly from the AC mains connection with a connection 132 to the neutral 135-1, since both line 125-1 and neutral 135-1 can be available whenever the device controller 120-3 is intended to be operational. Accordingly, the power plug 105-1 can be a simplified embodiment that eliminates the need for a power storage cell. For example, FIG. 5 illustrates a block diagram of a device controller 120-4, in accordance with certain embodiments of present disclosure. The device controller 120-4 may correspond to the device controller 120-3 of FIG. 4. Most other elements may be the same or similar to other embodiments disclosed herein.

Figure 6:
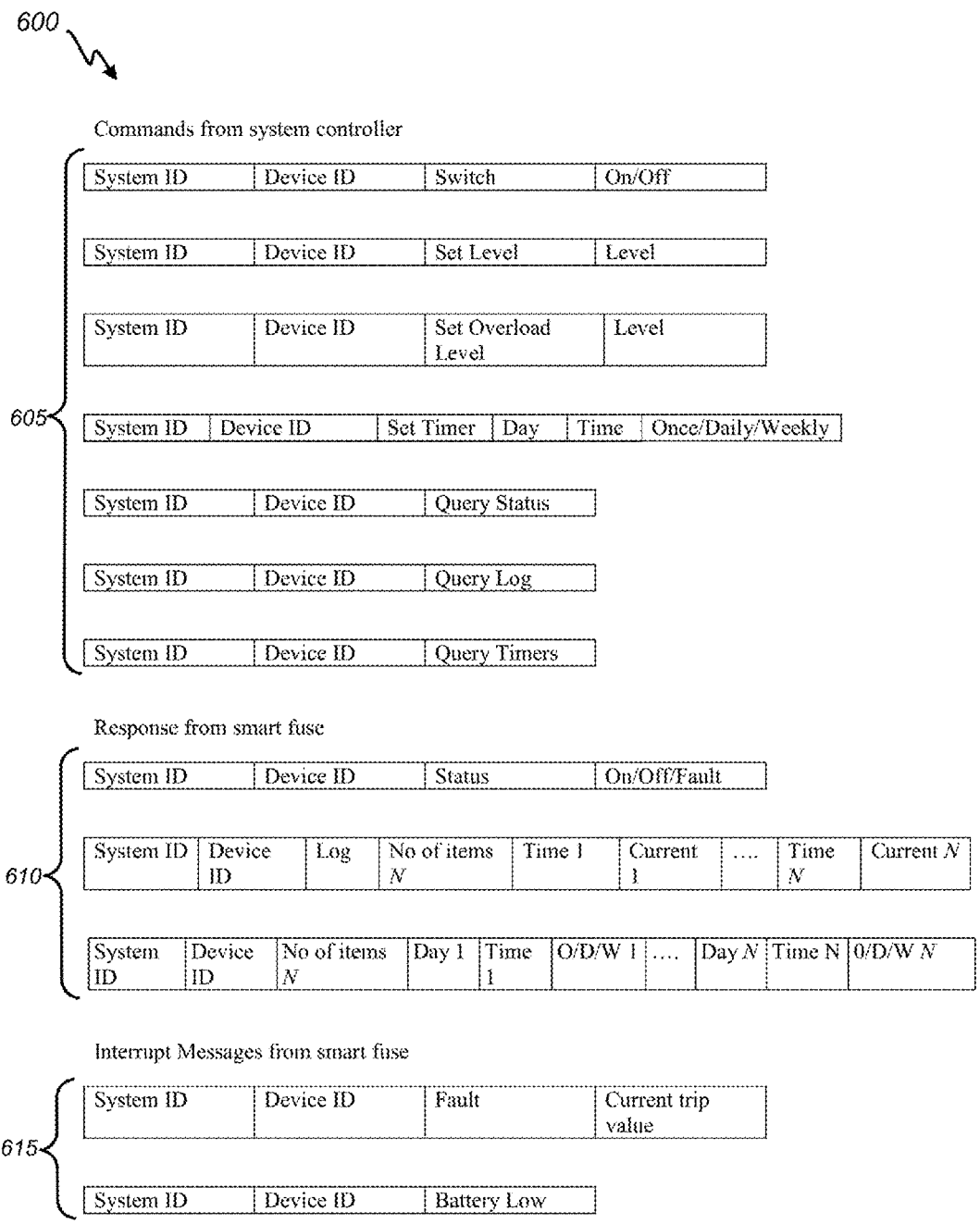
FIG. 6 illustrates a non-limiting set of communication protocols to facilitate communication, in accordance with certain embodiments of present disclosure.

FIG. 6 illustrates a non-limiting set of communication protocols 600 to facilitate communication, in accordance with certain embodiments of present disclosure. For example, such communication protocols 600 could be employed for communications between the device controller 120-2 and the system controller 170 and/or the mobile controller 175. The communication protocols 600 may be based upon common message structures. By way of example, message protocols 605 may apply to commands from the system controller 170, message protocols 610 may apply to responses from the device controller 120-2, and message protocols 615 may apply to interrupt message from the device controller 120-2. In various embodiments, additional commands, response, interrupts, and sequences may be added. Any suitable standardized protocols may be employed in various embodiments. In some embodiments, the protocols 600 may call for a system identification information and/or device identification information with each message.

Referring again to FIG. 3, the unique ID 360 of the device controller 120-2 may allow the device controller 120-2 to be uniquely identified on the system. The unique ID 360 may facilitate pairing the device controller 120-2 with the system controller 170 in some way. Any one or combination of several methods (e.g., bar code, QR code on the device packaging, serial number, device reader connected to computer, etc.) could be employed to provide the unique ID 360.

In some embodiments, a default mode for the device controller 120-2 may include the switch 365 being enabled so that, when the device under control 115 is first turned on with the device controller 120-2 installed, the power charging source 305 may be able to charge the power storage 310. The power storage 310 could be pre-charged in some embodiments to allow the device controller 120-2 to operate when first installed. With start-up of the device controller 120-2, the device controller 120-2 may be registered and paired with the system controller 170, if such has not already been done.

In some embodiments, the device controller 120-2 may be initially configured with current overload settings that correspond to standard fuse ratings. In order to provide increased protection, certain embodiments may allow for manual adjustment of the current overload settings. Certain embodiments of the device controller 120-2 may generate an automatic threshold by learning the normal operating state of the device controller 120-2. In such embodiments, the device controller 120-2 may monitor the normal operating flow of current from when the device under control 115 is switched on to when it reaches steady state. Typically, there is a surge of current when devices are switched on which then settles down to a lower value at steady state. Some devices (e.g., a TV, amplifier, computer, and/or the like) may have varying current profiles. In these cases, the profiles or at least certain peaks may be recorded. The device controller 120-2 may automatically turn off when an overload occurs that exceeds the defined current thresholds for a period of time. To be comparable with a standard fuse, the threshold may be dependent on the combination of current and time—i.e., a high current for a very short time, a smaller current for a longer period of time.

Certain embodiments may include a standard mechanical fuse element in series with the device controller 120-2. Such configurations may be necessary in order to comply with safety regulations in certain localities. In these cases, the device controller 120-2 may be configured to trigger before the mechanical fuse. Thus, the possibility to reset the smart fuse of the device controller 120-2 may be provided, thereby obviating the need to replace the mechanical fuse.

By monitoring the normal current flow over time, certain embodiments may be configured to provide a warning when the operating conditions are steadily changing over a period of time. For example, the device controller 120-2 may provide indication to the system controller 170 that there is an impending component failure, and the system controller 170 and/or the mobile controller 175 may present a warning. An impending component failure state, for example, could be detected if the device under control 115 starts to take more current over time when the device under control 115 is powered. The device controller 120-2 may be configured for other states, as well.

Once the device controller 120-2 has triggered a fault situation, it may communicate to the system controller 170 an indication of the event. The device controller 120-2 may determine if the event is a catastrophic failure with a continuing short circuit or if (as may be the case with a light bulb, e.g.) it is a fault that has now been removed. For example, the device controller 120-2 may do this by cycling the low current switch 315 to check for continuity. If the fault continues, then the device controller 120-2 may be set to default off, for safety reasons. Once the fault has been rectified, providing it has power, it will be possible to re-activate the device controller 120-2 from the system controller 170 and/or the mobile controller 175. Should the device be deactivated and the power storage 310 is discharged, certain embodiments may allow for removal of the device controller 120-2 and recharging it in an external adapter. This may include a means to forcefully recharge the internal power storage 310 by for instance inductive coupling.

Figure 7:
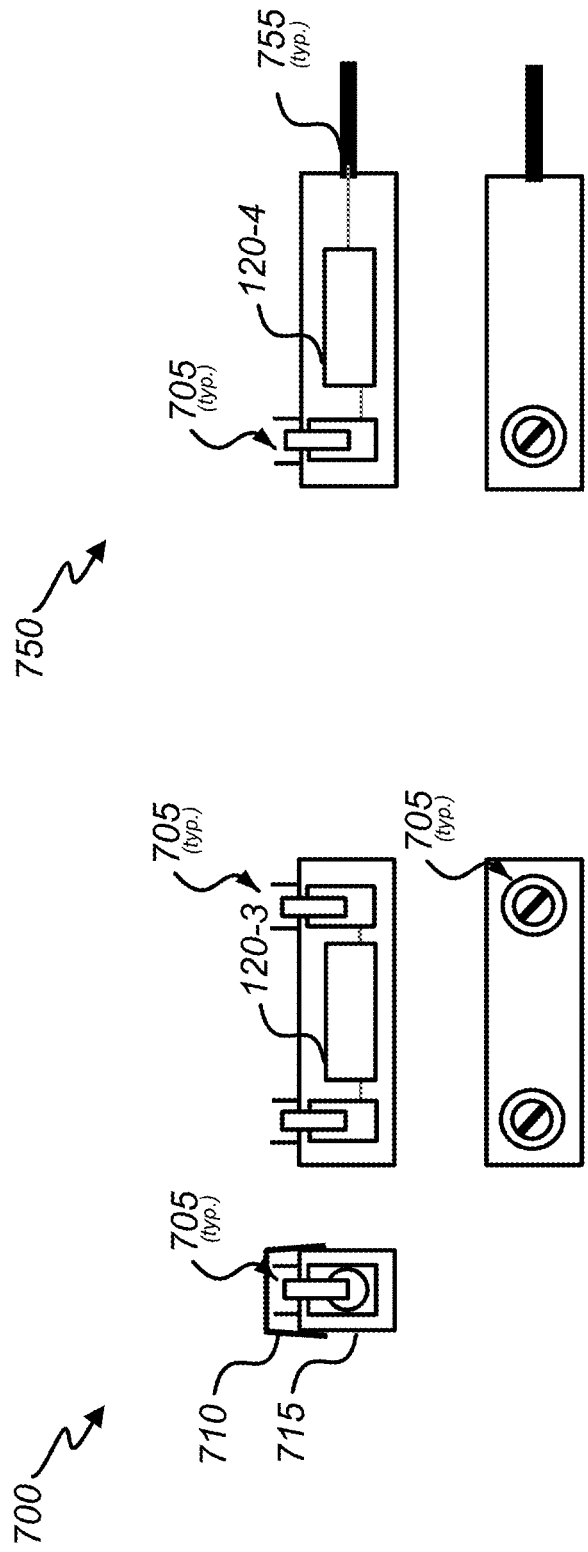
FIGS. 7A and 7B respectively illustrate diagrams of various smart terminals, in accordance with certain embodiments of present disclosure.

FIGS. 7A and 7B respectively illustrate diagrams of a smart terminal 700 and a smart terminal 750, in accordance with certain embodiments of present disclosure. FIG. 7A illustrates top, side, and end views of certain portions of the smart terminal 700. FIG. 7B illustrates top and side views of certain portions of the smart terminal 750. In these alternative embodiments, device controllers 120-3, 120-4 may be encapsulated in terminal connectors that can be used within existing electrical fittings.

The smart terminal 700 may include grub screw terminals 705 at each end. The alternative embodiment of the smart terminal 750 may include a grub screw terminal 705 at only one end. The smart terminal 750 may include an embedded rigid terminal pin 755 or a short length of wire with the end bared. The smart terminals 700, 750 could thus be easily installed within existing fittings such as a light switch, ceiling rose, wall socket, and/or the like. The smart terminals 700, 750 may include an insulating shroud 710 removably attached to the housing 715 to cover up the exposed contacts once the smart terminal 700, 750 has been placed in circuit and the screws 705 tightened to securely connect any wires.

Figure 8:
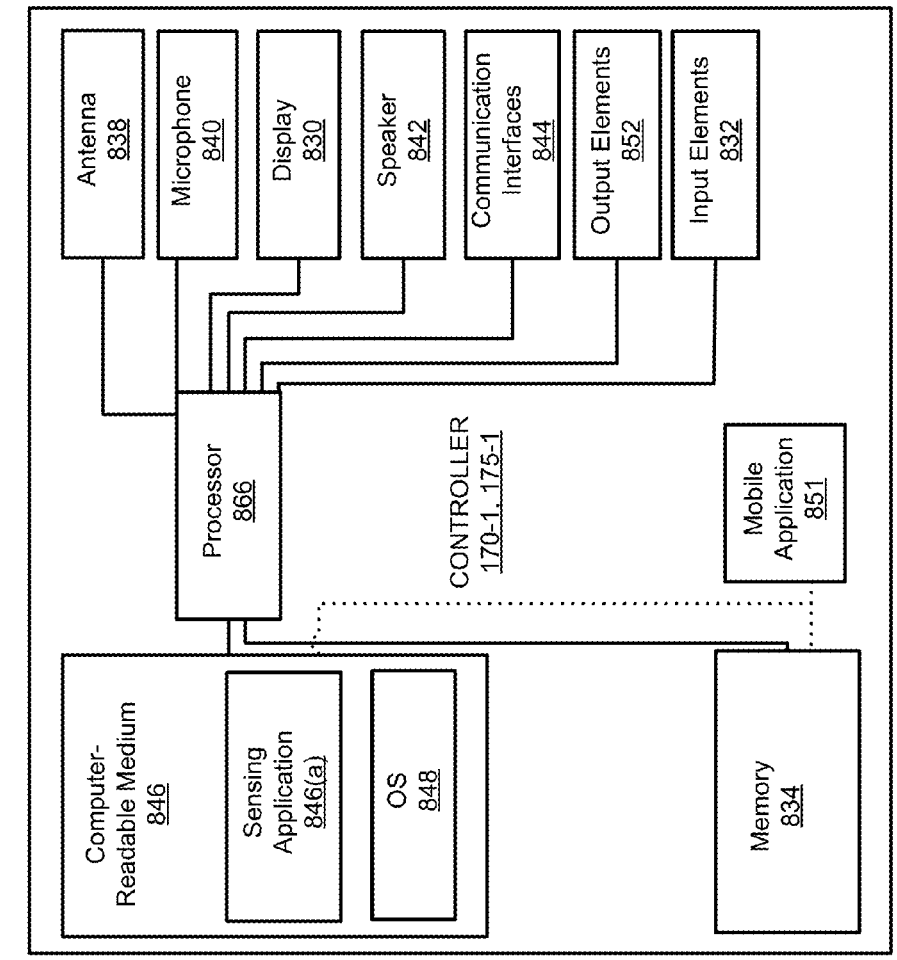
FIG. 8 is a functional block diagram of a computing device, which may correspond to one or more of controllers, according to certain embodiments of the present disclosure.

FIG. 8 is a functional block diagram of a computing device 800, which may correspond to one or more of controllers 170-1 and/or 175-1, according to certain embodiments of the present disclosure. In some embodiments, the computing device 800 may be mobile computing device. In some embodiments, the computing device 800 may be provided with a mobile application 851 configured to run on the computing device 800 to facilitate various embodiments of this disclosure. In some embodiments, instead of a mobile application 851, another type of application or instruction set may be configured to run on the computing device 800 to facilitate various embodiments of this disclosure. The computing device 800 may be any portable device suitable for sending and receiving information in accordance with embodiments described herein. For example without limitation, in various embodiments, the computing device 800 may include one or more of a mountable control unit, a mobile phone, a cellular telephone, a smartphone, a handheld mobile device, a tablet computer, a web pad, a personal digital assistant (PDA), a notebook computer, a handheld computer, a laptop computer, or the like.

As shown in FIG. 8, the computing device 800 includes a display 830 and input elements 832 to allow a user to input information into the computing device 800. By way of example without limitation, the input elements 832 may include one or more of a keypad, a trackball, a touchscreen, a touchpad, a pointing device, a microphone, a voice recognition device, or any other appropriate mechanism for the user to provide input. The display 830 may include a resistive or capacitive screen. The display 830 may be configured for stylus sensitivity which allows movement of the stylus on the screen to be detected. The touch-screen capability may be achieved via an electronic position location system capable of determining a location of a selected region of the display screen. A commercially available electronic position location system like the ones that are used in many commercially available devices such as personal digital assistants, tablet PCs, and smartphones, may be used. An exemplary system may comprise a glass or plastic plate with a metallic coating facing a metallic coating on an underside of a layer of Mylar™ above the glass or plastic plate.

The input elements 832 may include one or more of: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

The computing device 800 includes a memory 834 communicatively coupled to a processor 836 (e.g., a microprocessor) for processing the functions of the computing device 800. The computing device 800 may include at least one antenna 838 for wireless data transfer. The computing device 800 may also include a microphone 840 to allow a user to transmit voice communication through the computing device 800, and a speaker 842 to allow the user to hear alarms, voice communication, music, etc. In addition, the computing device 800 may include one or more interfaces in addition to the antenna 838, e.g., a wireless interface coupled to an antenna. The communications interfaces 844 can provide a near field communication interface (e.g., contactless interface, Bluetooth, Zigbee, optical interface, etc.) and/or wireless communications interfaces capable of communicating through a cellular network, such as GSM, or through Wi-Fi, such as with a wireless local area network (WLAN). Accordingly, the computing device 800 may be capable of transmitting and receiving information wirelessly through both short range, radio frequency (RF) and cellular and Wi-Fi connections.

The computing device 800 can also include at least one computer-readable medium 846 coupled to the processor 836, which stores application programs and other computer code instructions for operating the device, such as an operating system (OS) 848. The mobile application 851 may be stored in the memory 834 and/or computer-readable media 846. In certain embodiments, the computing device 800 may include a non-transitory computer-readable storage medium, e.g., memory 834. The computer-readable medium 846 can include a sensing application 846(*a*) to gather and/or process any suitable information regarding sensors (e.g., temperature, light, etc.) in accordance with various embodiments, including, for example, data gathered from sensors of the computing device 800.

Figure 9:
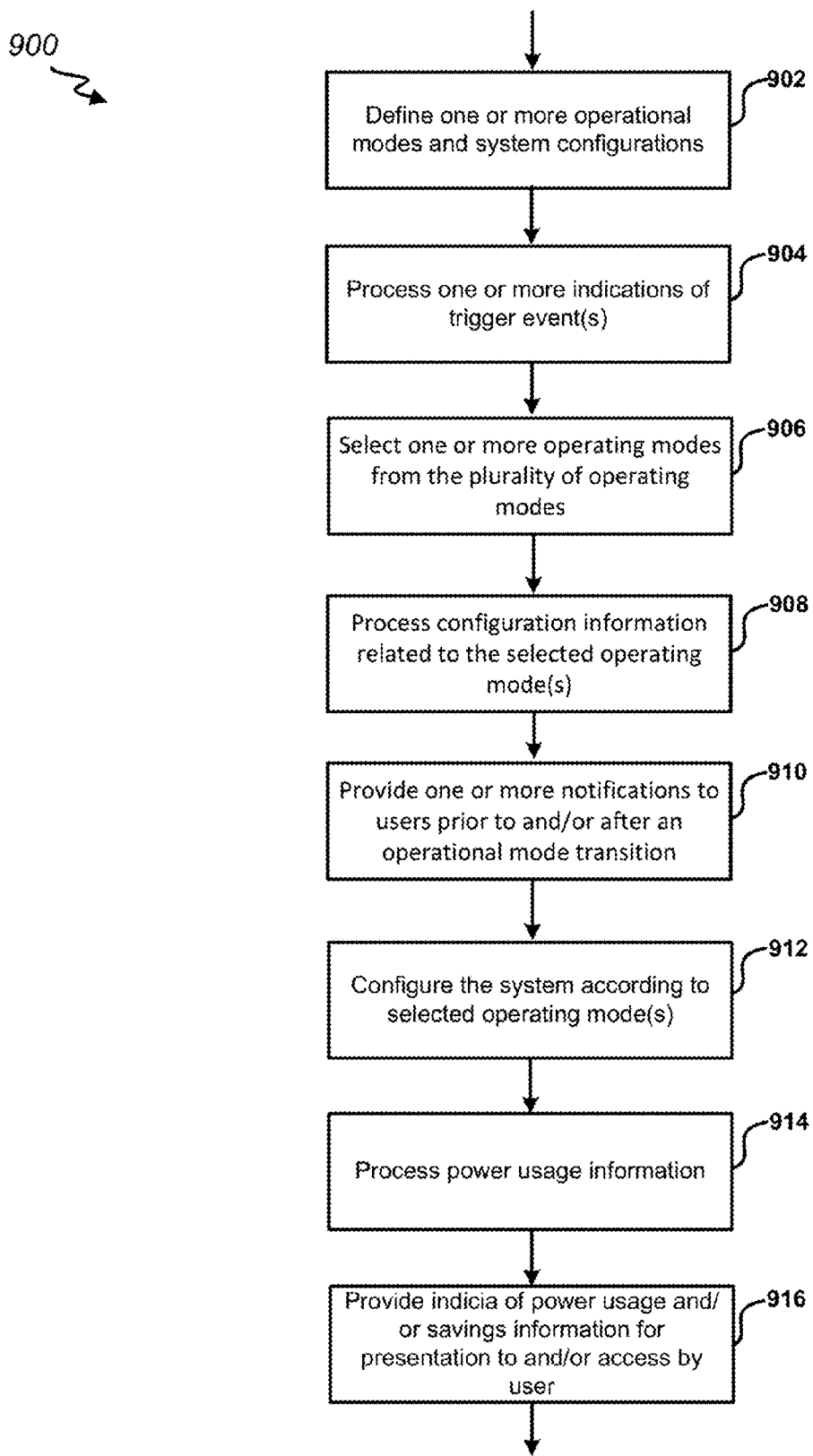
FIG. 9 illustrates an example method for enabling device control, in accordance with certain embodiments of the present disclosure.

Referring now to FIG. 9, an example method 900 for enabling device control, in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 902, in some embodiments, one or more operational modes and system configurations may be defined. The one or more operational modes may include any suitable number of modes for any suitable system configurations, which may have any suitable number of device controllers 120 and devices under control 115. The end user could have the option to define and/or select one or more operational modes via controllers 170, 175 in some embodiments. In some embodiments, the device controller 120 and/or controllers 170, 175 may be preset by, say a manufacturer and/or service provider, with the one or more operational modes. In some embodiments, the device controller 120 and/or controllers 170, 175 may be configured to automatically define one or more operational modes based at least in part on detecting the particular type of device under control coupled to the device controller 120. For example, the device controller 120 and/or controllers 170, 175 may be configured to automatically identify a type of load, which may or may not allow for current variation.

In some implementations, multiple operational modes may be defined to allow for one or more power savings modes. In various embodiments, a power savings configuration could be based on one or more of time of day, day of week, season (e.g., summer), location, temperature, and/or any other suitable basis. For example, a power savings configuration could designate a certain time period in the day for a power savings mode. This could correspond to prime time appliance usage periods. It could correspond to relatively hot time periods of the day for locations and seasons where the heat of the day requires high levels of air conditioning and, thus, power consumption. A power savings configuration could designate a temperature threshold such that the savings mode would be initiated when an outside temperature in the location meets or exceeds the temperature threshold. In some embodiments, a service provider or other data source may push indications of local outside temperature to the system. Alternatively or additionally, television receivers may pull indications of local outside temperature from a service provider or other data source. Some implementations could come to the end user preprogrammed to allow user selection of such options. In some cases, the user-selectable options may allow a user to modify criteria for power savings modes. For example, there may be provided a user-selectable option to adjust a temperature threshold such that the savings mode would be initiated when an outside temperature in the location meets or exceeds the temperature threshold.

As indicated by block 904, the device controller 120 may process an indication of a trigger event. The trigger event may correspond to a control command from a controller 170, 175, a predetermined operational mode trigger (e.g., time, date, temperature, light level, etc.), or detection of an overcurrent. As indicated by block 906, the device controller 120 may select an operating mode from the plurality of operating modes based at least in part on the indication of the trigger event. In some cases, there may be only two operating modes—on and off. In other embodiments, there may be more than two operating modes. The multiple powers saving modes could include any combination of user-defined power savings mode(s), preset power saving mode(s), static power savings mode(s), and/or the like.

As indicated by block 908, the configuration information related to the selected operating mode(s) may be processed by any one or combination of the controller 170, controller(s) 175, and/or device controller(s) 120. The configuration information could include information about a set of one or more devices under control 115 for the system, a set of one or more corresponding device controllers 120, a set of one or more corresponding communications, and/or the like. By way of example, the configuration information could include information about certain devices under control 115 that can be turned on, turned off, or otherwise controlled. As a more specific example, a primary television receiver located in a living room may be subject to a first power savings configuration for a particular usage period, and a secondary television receiver located in a bedroom may be subject to a second power savings configuration for the particular usage period.

As indicated by block 910, in some embodiments, the system may provide one or more notifications to users prior to and/or after an operational mode transition to inform the user of the change. Some notifications can only be provided after the operational mode transition (e.g., overload current protection). Notifications may be presented at the controllers 170 and/or 175. A notification could be provided for all changes or for only select changes. As indicated by block 912, the system may be configured according to the selected operating mode(s). As indicated by block 912, the system may be configured according to a second operating mode. The second operating mode may correspond to the initial, default, and/or normal operating mode such that the television receiver returns to the former state that it was in prior to entering one or more power savings modes. In some embodiments, the second set of operating mode(s) may correspond to another operating mode, and any one or combination of steps 902 to 910 may be performed with respect to the second set of operating mode(s). The second set of operating mode(s) could be selected based at least in part on dynamic adjustment in view of a performance goal (say, power saving goal), or in view of a newly identified performance goal. The second power savings mode could be selected based at least in part on a gradated power savings scheme to address a fluctuation of customer usage.

As indicated by block 914, in some embodiments, the system may process power usage information. In various embodiments, the system may monitor, measure, detect, estimate, and/or otherwise gather information pertaining to power usage and/or savings. The power usage information may be conveyed by the device controllers 120, the system controller 170 and/or the mobile controller(s) 175, in various embodiments. Any suitable power usage and/or savings metrics may be derived to indicate power usage and/or savings associated with any one or combination of operational modes of the system. This may allow for the surfacing of savings information to an end user. As indicated by block 916, in some embodiments, the system controller 170 and/or the mobile controller(s) 175 may provide indicia of power usage and/or savings information for presentation to and/or access by an end user.

A power usage history for the system may thus be compiled for informing an end user and/or a service provider. Power usage information may be processed for any suitable time period. For example, current usage or usage over a past time period may be determined and compared to a previous corresponding time period (e.g., the past month's usage may be compared to usage from a previous month, one year's usage may be compared to a previous year's usage, etc.). In some embodiments, the accounting of the usage may consider pricing information that may be estimated, assumed, and/or gathered from the user's electricity provider to provide indicia of cost savings. The user could provide input of pricing information in some implementations. In some cases, a service provider may gather pricing information from the user's electricity provider and/or electricity providers servicing the user's general locality. The pricing information could correspond to average or otherwise typical pricing for the user's general locality.

Figure 10:
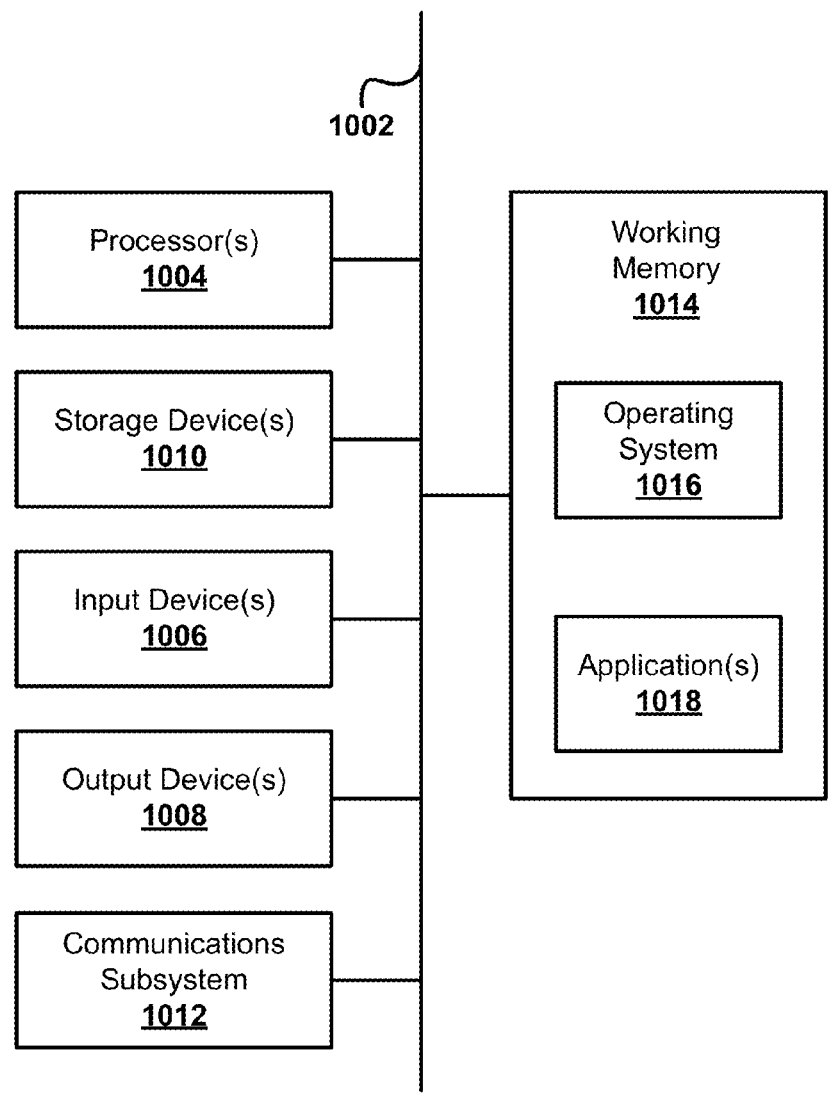
FIG. 10 illustrates a computer system, in accordance with certain embodiments of the present disclosure.

A computer system as illustrated in FIG. 10 may be incorporated as part of the previously described computerized devices. FIG. 10 provides a schematic illustration of one embodiment of a computer system 1000 that can perform various steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, video decoders, and/or the like); one or more input devices 1015, which can include without limitation a mouse, a keyboard, remote control, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 1002.11 device, a WiFi device, a WiMax device, cellular communication device, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 835 from another computer-readable medium, such as one or more of the non-transitory storage device(s) 825. Merely by way of example, execution of the sequences of instructions contained in the working memory 1035 might cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed. As such, computer system 1000 may be interpreted as a distributed computing system that performs processing in multiple locations. In some instances, computer system 1000 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system to facilitate wireless device monitoring and control, the system comprising:
   a device controller adapted to be disposed within a power connector in series with conductors of the power connector, the power connector adapted to provide power from a power source to a device, the device controller:
      comprising two terminals to electrically couple the device controller with the conductors of the power connector;
      comprising a power component to power the device controller; and
      configured to:
         monitor one or more conditions of the device;
         based at least in part on the monitoring, store a plurality of data recordings corresponding to operations of the device over a period of time;
         create reporting data based at least in part on the stored plurality of data recordings;
         control one or more functions of the device; and
         wirelessly communicate with a system controller that is remote from the power connector and the device, wherein the communicating comprises transmitting the reporting data to the system controller;
   wherein the power connector corresponds to a power plug and/or a terminal block.

2. The system to facilitate wireless device monitoring and control of claim 1, wherein the device controller is further configured to:
   provide overcurrent protection for the device to protect the device from overload.

3. The system to facilitate wireless device monitoring and control of claim 1, further comprising:

the system controller, wherein the system controller is configured to:
  wirelessly communicate with a set of one or more device controllers, the set of one or more device controllers comprising the device controller; and
  monitor the set of one or more device controllers.

4. The system to facilitate wireless device monitoring and control of claim 3, wherein the system controller is further configured to:
  control the set of one or more device controllers.

5. The system to facilitate wireless device monitoring and control of claim 4, wherein:
  the system controller is further configured to:
    process an indication of a trigger event;
    select a configuration from a set of system configurations based at least in part on the indication of the trigger event; and
    transmit a command to at least one device controller of the set of one or more device controllers to cause the at least one device controller to control the device in conformity with a first operational mode, the at least one device controller comprising the device controller; and
  the device controller is further configured to:
    in response to the command, control the device in conformity with the first operational mode at a first time.

6. The system to facilitate wireless device monitoring and control of claim 5, the device controller is further configured to:
  control the device in conformity with a second operational mode at a second time after the first time.

7. The system to facilitate wireless device monitoring and control of claim 5, wherein the configuration corresponds to a power savings configuration.

8. A method to facilitate wireless device monitoring and control, the method comprising:
  adapting a device controller to be disposed within a power connector, in series with conductors of the power connector, the power connector adapted to provide power from a power source to a device, the device controller comprising:
    two terminals to electrically couple the device controller with the conductors of the power connector; and
    a power component to power the device controller; and
  configuring the device controller to:
    monitor one or more conditions of the device;
    based at least in part on the monitoring, store a plurality of data recordings corresponding to operations of the device over a period of time;
    create reporting data based at least in part on the stored plurality of data recordings;
    control one or more functions of the device; and
    wirelessly communicate with a system controller that is remote from the power connector and the device, wherein the communicating comprises transmitting the reporting data to the system controller;
  wherein the power connector corresponds to a power plug and/or a terminal block.

9. The method to facilitate wireless device monitoring and control of claim 8, further comprising:
  configuring the device controller to provide overcurrent protection for the device to protect the device from overload.

10. The method to facilitate wireless device monitoring and control of claim 8, further comprising:
  configuring the system controller to:
    wirelessly communicate with a set of one or more device controllers, the set of one or more device controllers comprising the device controller; and
    monitor the set of one or more device controllers.

11. The method to facilitate wireless device monitoring and control of claim 10, further comprising:
  configuring the system controller to control the set of one or more device controllers.

12. The method to facilitate wireless device monitoring and control of claim 11, further comprising:
  configuring the system controller to:
    process an indication of a trigger event;
    select a configuration from a set of system configurations based at least in part on the indication the of the trigger event; and
    transmit a command to at least one device controller of the set of one or more device controllers to cause the at least one device controller to control the device in conformity with a first operational mode, the at least one device controller comprising the device controller; and
  configuring the device controller to:
    in response to the command, control the device in conformity with the first operational mode at a first time.

13. The method to facilitate wireless device monitoring and control of claim 12, further comprising:
  configuring the device controller to control the device in conformity with a second operational mode at a second time after the first time.

14. The method to facilitate wireless device monitoring and control of claim 12, wherein the configuration corresponds to a power savings configuration.

15. One or more non-transitory, machine-readable media having machine-readable instructions thereon which, when executed by one or more processing devices, facilitates wireless device monitoring and control, causing the one or more processing devices to:
  monitor one or more conditions of a device via a device controller adapted to be disposed within a power connector in series with conductors of the power connector, the power connector adapted to provide power from a power source to the device;
  based at least in part on the monitoring, store a plurality of data recordings corresponding to operations of the device over a period of time;
  create reporting data based at least in part on the stored plurality of data recordings;
  control one or more functions of the device via the device controller; and
  wirelessly communicate, via the device controller, with a system controller that is remote from the power connector and the device, wherein the communicating comprises transmitting the reporting data to the system controller;
  wherein the power connector corresponds to a power plug and/or a terminal block.

16. The one or more non-transitory, machine-readable media of claim 15, the instructions further causing the one or more processing devices to:
  provide overcurrent protection for the device to protect the device from overload.

17. The one or more non-transitory, machine-readable media of claim 15, the instructions further causing the one or more processing devices to:

wirelessly communicate information to the system controller to facilitate monitoring of the device by the system controller.

18. The one or more non-transitory, machine-readable media of claim 17, the instructions further causing the one or more processing devices to:
process a set of one or more commands received from the system controller to control the device controller; and
cause the device controller to act in conformity with the set of one or more commands.

19. The one or more non-transitory, machine-readable media of claim 17, the instructions further causing the one or more processing devices to:
transmit an indication of a trigger event to the system controller;
process a command from the system controller; and
responsive to the command, control the device in conformity with a first operational mode at a first time.

20. The one or more non-transitory, machine-readable media of claim 19, the instructions further causing the one or more processing devices to:
control the device in conformity with a second operational mode at a second time after the first time.

* * * * *